United States Patent
Bonhoure et al.

(10) Patent No.: US 6,424,889 B1
(45) Date of Patent: Jul. 23, 2002

(54) METHOD FOR GENERATING A HORIZONTAL PATH AVOIDING DANGEROUS ZONES FOR AN AIRCRAFT

(75) Inventors: Fabienne Bonhoure, Velizy; Fabien Inglese, Issy les Moulineaux, both of (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/646,917

(22) PCT Filed: Feb. 11, 2000

(86) PCT No.: PCT/FR00/00345
§ 371 (c)(1),
(2), (4) Date: Oct. 12, 2000

(87) PCT Pub. No.: WO00/48049
PCT Pub. Date: Aug. 17, 2000

(30) Foreign Application Priority Data

Feb. 12, 1999 (FR) .............................................. 99 01720

(51) Int. Cl.⁷ .............................. G05D 1/00; G06G 7/76
(52) U.S. Cl. .............................. 701/3; 701/13; 701/120; 701/121; 701/301; 340/947; 340/961; 244/183
(58) Field of Search ................................ 701/3, 13, 14, 701/16, 200, 207, 209, 120, 121, 122, 300, 301; 340/945, 947, 948, 961; 244/75 R, 76 R, 175, 183

(56) References Cited

U.S. PATENT DOCUMENTS 6,154,693 A * 11/2000 Aberschitz et al. ............ 701/16
6,175,804 B1 * 1/2001 Szczerba ..................... 701/209
6,181,987 B1 * 1/2001 Deker et al. .................... 701/3

* cited by examiner

Primary Examiner—Jacques H. Louis-Jacques
(74) Attorney, Agent, or Firm—Oblon, Spivak, McClelland, Maier & Neustadt, P.C.

(57) ABSTRACT

A method for generating a horizontal path for the avoidance of danger zones for an aircraft. The method models the contours of each danger zone by a succession of segments demarcated by points. The method determines two homing circles and two capture circles passing respectively through the initial point and final point which are tangential respectively to the initial route and to the final route and have respectively the initial and final turning radius. The method also determines tangents both to the homing circles or the capture circles and to the contour of each danger zone. Among these tangents, a pair of tangents to a homing circle and to a capture circle are selected, defining a path skeleton connecting a homing circle to a capture circle without meeting a danger zone. And, an automatically controllable evasion path that lies on the previously defined path skeleton is then determined.

12 Claims, 3 Drawing Sheets

METHOD FOR GENERATING A HORIZONTAL PATH AVOIDING DANGEROUS ZONES FOR AN AIRCRAFT

BACKGROUND OF THE INVENTION

1. Field of the Invention

The present invention relates to the plotting of an instructed horizontal path for a moving body that has to go from one obligatory point of passage to another in accordance with constraints dictated by instructed values of turning radius, the instructed values of approach direction in terms of route or course to be maintained at the obligatory points of passage and the instructions for danger zone avoidance.

2. Discussion of the Invention

It can be applied especially but not exclusively to the real-time plotting, by the navigation system of an aircraft, of a path to be followed between two obligatory points of passage that is in keeping with the constraints of approach direction and turning radius at the obligatory points of passage and the constraints of danger zone avoidance. This result is sought so that an aircraft on mission has a constantly updated flight plan on board that can be exploited at any time during the mission by the aircraft flight management system to provide the pilot with navigation assistance and, if necessary, to direct an automatic piloting system.

Hitherto, there has been no known method, within the scope of the computing capacities of flight management systems in present-day aircraft, for generating a horizontal path that meets the constraints of approach direction and turning radius at obligatory points of passage and of danger zone avoidance.

The path to be followed is therefore computed by means located on the ground when the mission is being prepared and is introduced into the flight management system of the aircraft before departure on mission.

However, the pilot, during flight, may have to follow a new path for example subsequently to a change in mission or the appearance of a new danger zone on the initial path. He therefore must determine a new path and follow it.

Determining a new path in operational conditions is a difficult task for the pilot because he often has to choose between many possibilities. It is difficult for him to appreciate which of these possibilities is most appropriate for his mission, especially as he must always decide very quickly. Furthermore, when the new path chosen has not been taken into account during the preparation of the mission, the pilot lacks the elements on board with which to make the new path exploitable by the flight management system and is required to take back the flight controls.

To relieve the pilot of the piloting task even in unexpected situations, it has been proposed to equip an aircraft with an additional navigational assistance computer capable of proposing new paths to resolve the problem raised. However, equipment of this kind proves to be very costly and does not entirely meet the pilot's requirements since there is a lengthy response time, often incompatible with the reaction time imposed on the aircraft pilot. Furthermore, the proposed paths are often unsuited to the problem raised. They lack precision and cannot always be exploited by the aircraft flight management system, since the pilot himself has to take command of the flight controls in following the instructions given to him on the proposed paths.

Furthermore, as soon as the evasion routes within a field of danger zones becomes slightly winding, the methods generally used to compute the evasion path in these navigational assistance computers become incapable of preparing a path that crosses this field of danger zones without penetrating one of these zones or again they become incapable of meeting the planned goal. Indeed, to be able to plot the evasion paths in real time, these methods generally simplify the problem to be resolved by likening the danger zones to circles circumscribed within the contours of the danger zones. The result thereof is that these zones have elongated shapes. The paths obtained circumvent these zones at great distances leading to evasion paths lengths that are excessive and therefore highly penalizing in terms of compliance with any precise timing of the mission and fuel autonomy. Consequently, paths of this kind may be incompatible with the mission goals of an aircraft. Furthermore, when the danger zones are very close to each other, this approximate modelling in disk form leads to overlapping zones, thus ruling out a solution of penetration of the danger zone field.

SUMMARY OF THE INVENTION

The present invention seeks to eliminate these drawbacks.

It is also aimed at facilitating an aircraft pilot's task by relieving him of the navigation problems linked to an unexpected re-routing during a mission preparation and transferring them to the flight management system of the aircraft, To this end, there is proposed a method for the generation of a horizontal path of danger zone avoidance between two obligatory points of passage that complies with constraints of approach direction and turning radius at the obligatory points of passage and constraints of the avoidance of danger zones demarcated by contours.

According to this invention, this method is characterized in that it comprises the following steps:

the modelling of the contours of each danger zone by a succession of segments demarcated by geographical points, the determining of the characteristics of a first homing circle and second homing circle, passing through the initial point, that are tangential to the initial route and have a radius corresponding to that of the initial turn, these two circles having directional senses of travel that are in reverse to each other, determined by the directional sense of the initial route, the determining of the characteristics of a first capture circle and second capture circle passing through the final point, that are tangential to the final route and have a radius corresponding to the final turn, these two circles having directional senses of travel that are in reverse to each other, determined by the directional sense of the final route, the determining of the characteristics of the tangential routes common to the homing circles and to the contour of each danger zone, common to the capture circles and to the contour of each danger zone, among the previously determined tangents, the selection of a tangent to one of the homing circles and of a route tangential to one of the capture circles so that these two tangents define a path skeleton connecting a homing circle to a capture circle without penetrating a danger zone, the determining of an automatically controllable evasion path that lies on the previously defined path skeleton, and the following by the aircraft of the path thus defined.

The invention thus uses relatively simple computations, which can therefore be performed by the computation means presently available on aircraft, to determine a path for the avoidance of danger zones to be avoided, this path being capable of being implemented without delay in a form that is directly exploitable by the flight management system for automatic piloting. Furthermore, since the danger zones are modelled by successions of segments, the evasion paths go as close as possible to the avoidance zones without however penetrating therein.

According to a particular feature of the invention, this method furthermore comprises the optimizing of the evasion path by the addition of an intermediate path segment between the selected routes tangential to the homing circle and to the capture circle.

According to another particular feature of the invention, if the determined evasion path has a length exceeding a certain threshold that is pre-determined in relation to the length of the initial paths without danger zones, then the method furthermore comprises the determining of a path that penetrates the interior of the field of danger zones without going through a danger zone.

When the configuration of the danger zones allows it, these arrangements produce paths that are even shorter than the previously computed evasion path.

According to another particular feature of the invention, circles of equiprobability of danger are centered on points demarcating the contour segments of the danger zones, the diameter of these circles corresponding to a fineness of gridding of the terrain, the tangents to the danger zones that are determined being tangential to these circles.

Advantageously, the invention furthermore comprises the prior selection of danger zones to be taken into account for the computation of an avoidance path, in selecting all the danger zones having points of definition on their contour located in a disk centered in the middle of the segment demarcated by the initial and final points and including these points.

BRIEF DESCRIPTION OF THE DRAWINGS

An embodiment of the device according to the invention shall be described here below as a non-restrictive example with reference to the appended drawings, of which.

DESCRIPTION OF THE PREFERRED EMBODIMENTS

Figure 1:
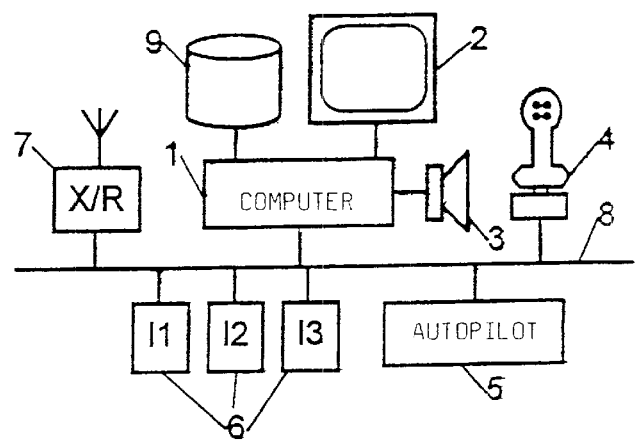
FIG. 1 gives a schematic view of the electronic equipment on board an aircraft used to implement the method according to the invention.

The method of the invention is particularly well suited to implementation by electronic equipment on board an aircraft. As shown in FIG. 1, this equipment comprises a computer 1 connected to one or more display screens 2, a mass memory 9 and possibly an alarm signalling device coupled to a loudspeaker 3 and/or light indicators. This computer 1 is connected, for example by a data transmission network 8 fitted into the aircraft, to the on-board sensors and flight instruments 6, the piloting controls 4, a flight management system or automatic piloting device 5 and a digital data transmission device 7, for example of the data link type. Thus, the computer 1 can make real-time acquisition of data coming out of other on-board electronic equipment, especially data such as the geographical position of the aircraft, its altitude, speed and condition and the quantity of fuel available.

The automatic piloting device has a memory in which the current path being taken by the aircraft is recorded. This path is constituted by a sequence of straight segments or constant-route segments between a starting point and a destination point, these segments being connected by arcs of circles.

The mass memory 9 contains characteristics of the aircraft and especially data defining its maneuvering possibilities such as the minimum turning radius as a function of speed and the fuel consumption as a function of speed as well as all the mission data.

The mission data comprises especially:

map data by which, in particular, the computer 1 can obtain the display, on the screen 2, of a geographical map of the zone flown over during the mission, data pertaining to navigation, for example data on the geographical position and characteristics of radio beacons and aerodromes accessible to the aircraft during the mission, data defining the planned path, used by the computer to display this path on the screen in an overlay on the picture of the map, data on danger zones, if any, to be avoided and weather conditions expected during the mission in the zone flown over.

The data on the planned path includes data on the position of the obligatory points of passage associated with a meeting time and an overflying altitude.

The data for each danger zone comprises the respective geographical positions of a series of contour definition points demarcating successive segments that model the contour of the danger zone.

All this data may be modified at any time, either directly by the pilot or on-board sensors and instruments or through information received by the radio link or the data transmission network. Should the goal of the mission be modified, implying the definition of a new path capable of crossing danger zones, or should a new danger zone be identified, it would then appear to be desirable to be able to determine an avoidance path in real time taking account of the presence of these danger zones.

Figure 2:
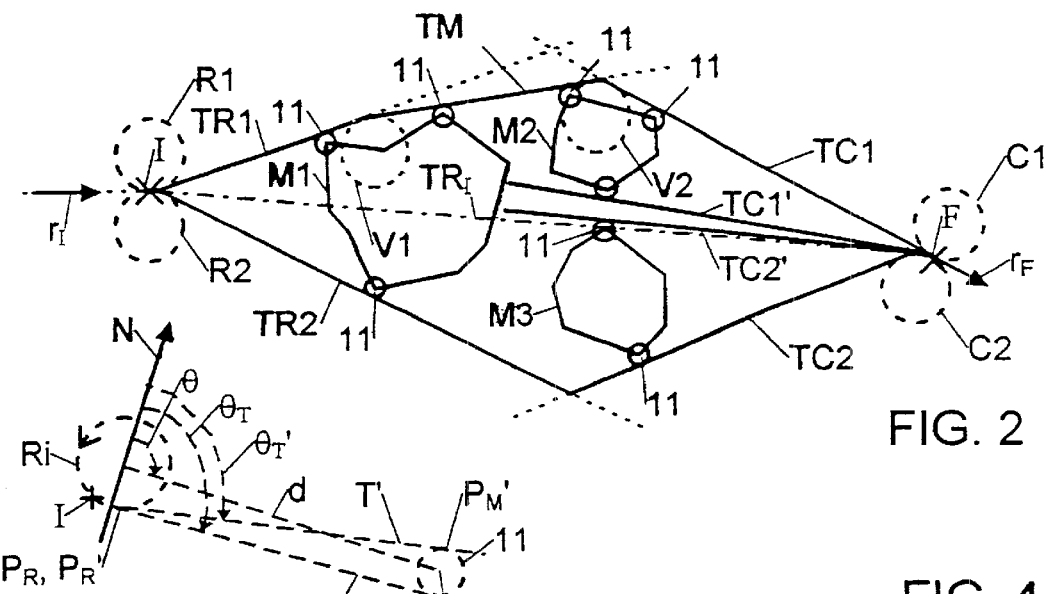
FIG. 2 shows a path skeleton for circumventing danger zones obtained by the method according to the invention.

To this end, the computer 1 determines the obligatory points of passage, namely the initial point I and final point F, to that must be connected by the avoidance path, these points being associated with respective constraints of the route, $r_I$ and $r_F$ (see FIG. 2). The point I and the route $r_I$ may correspond for example to the current position and route of the aircraft or to the next dictated point of passage.

The computer 1 then places two circles, called homing circles R1, R2, tangential at the point I to the initial route $r_I$ and two circles known as capture circles C1 and C2 tangential at the point F to the final route $r_F$, these circles being associated with a directional sense of travel defined by the direction of the respective tangential route. The radius of the circles R1, R2, C1, C2 corresponds to the turning radius of the aircraft and is determined for example as a function of the current speed of the aircraft and a maximum load factor. The capture and homing circles that go through a danger zone are eliminated.

The computer 1 then selects the danger zones to be taken into account for computing an avoidance path in eliminating all the danger zones that are located completely outside a disk centered on the middle of the segment IF connecting the initial point I to the final point F and including these points. It is possible, for this purpose, to choose a disk with a radius equal to a half length of the segment IF to which the homing and capture turning radii are added, or twice a maximum turning radius of the aircraft. This selection may be done by computing the geographical co-ordinates of the middle of the segment IF and testing to see if at least one point defining the contour of each danger zone is at a distance from this midpoint that is smaller than the radius of the disk considered.

FIG. 2 shows the danger zones M1, M2, M3 which are at least partially in the disk thus demarcated and therefore taken into account in the rest of the computations.

It turns out that this principle of selecting danger zones gives good results in most cases.

According to the invention, the computer determines the tangents TR1 and TR2 to the homing circles R1 and R2 and to the danger zones M1, M2, M3 selected. It similarly determines the tangents TC1, TC2, TC1' and TC2' to the capture circles C1, C2 and to the danger zones M1, M2, M3.

More specifically, these tangents rely not on the points demarcating the contour segments of the danger zones but on circles 11 of equiprobability of danger whose diameter corresponds to the fineness of gridding of the zone flown over.

Figure 4:
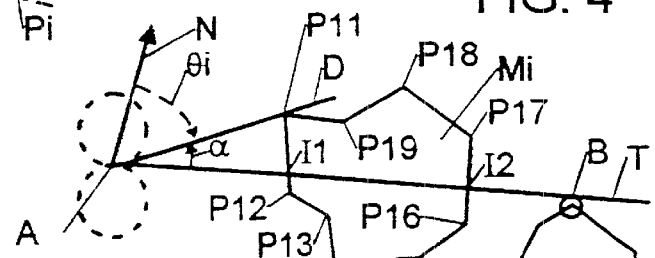

To this end, it determines firstly, for each point I and F shown in the reference A in FIG. 4, for each danger zone Mi and for each point Pi (P11 to P19 of FIG. 4) of the danger zone Mi, the route angle $\theta i$ corresponding to the straight line D passing through the points A and Pi, this angle being identified for example with respect to the direction of the geographical North, between $-180°$ and $+180°$. It then selects the points P11 and P14 of the contour of the zone Mi which corresponds to the minimum and maximum angles $\theta i$.

Figure 3:
FIGS. 3 and 4 are partial views of a path to be determined, used to illustrate the computation method implemented to determine a tangent to a danger zone and the points of intersection between a straight line and the contours of a danger zone.

For each of these points P11 and P14 represented by Pi in FIG. 3, it determines the homing circle Ri (or capture circle) to be used that corresponds to the shortest turning phase, and then the route angles $\theta T$ and $\theta_T'$ of the two tangents T and T' to the circle Ri and to the circle of equiprobability 11 centered on the point Pi, by means of the following formula:

$$\theta_T = \theta - a\sin\frac{R_M - R_R}{d} \quad (1)$$

wherein:

$\theta$ is the angle of route corresponding to the straight line connecting the centers of the circles Ri and 11, d is the distance between the centers of the circles Ri and 11, $R_M$ and $R_R$ are the respective radii of the circles 11 and Ri and are assigned the negative sign if the circle is travelled through in an anticlockwise sense, else it is assigned the positive sign.

Thus, in the example of FIG. 3, $R_R$ is assigned the negative sign for the two tangents T and T', while $R_M$ is assigned the negative sign for the tangent T and the positive sign for the tangent T'.

For the two points P11, P14 corresponding to the minimum and maximum route deviations, four tangents T are obtained. These are determined by their route angle $\theta_T$, among which those corresponding to the minimum and maximum route angles are selected in such a way as to select the tangents that do not penetrate the danger zone.

The computer 1 then determines the geographical position of the tangency points $P_R$ to the circle Ri and $P_M$ to the circle 11 of the two selected tangents. The co-ordinates of these points may be obtained by the following formula:

$$P_R = \begin{pmatrix} x_{PR} \\ y_{PR} \end{pmatrix} = \begin{pmatrix} x_R + |R_R|\cdot\cos\left(\theta_T - sgn(R_R)\cdot\frac{\pi}{2}\right) \\ y_R + |R_R|\cdot\sin\left(\theta_T - sgn(R_R)\cdot\frac{\pi}{2}\right) \end{pmatrix} \quad (2)$$

$$P_M = \begin{pmatrix} x_{PM} \\ y_{PM} \end{pmatrix} = \begin{pmatrix} x_P + |R_M|\cdot\cos\left(\theta_T - sgn(R_M)\cdot\frac{\pi}{2}\right) \\ y_P + |R_M|\cdot\sin\left(\theta_T - sgn(R_M)\cdot\frac{\pi}{2}\right) \end{pmatrix} \quad (3)$$

wherein:

$x_R$ and $y_R$ are the geographical co-ordinates of the center of the circle Ri considered, $sgn(R_R)$ is the sign function applied to the radius $R_R$ of the circle Ri, this function having a value 1 if $R_R$ is positive and $-1$ if $R_R$ is negative, $x_M$ and $y_M$ are the geographical co-ordinates of the center of the circle 11 considered, $sgn(R_M)$ is the sign function applied to the radius $R_M$ of the circle 11.

What has to be done then is to find out if each tangent thus computed meets or does not meet a danger zone.

To this end, as shown in FIG. 4, the computer 1, for each of these tangents T to a danger zone M, and successively for each point P11 to P19 modelling the contour of each of the other danger zones Mi, determines the sign of the angle $\alpha$ between the tangents studied T and the straight line D passing through the point A (representing the initial point I or final point F) of tangency of a tangent T with the homing or capture circles Ri and the considered point P11 to P19 of the contour. Each change in sign of this angle $\alpha$ for two successive points P11 to P19 of one and the same danger zone Mi indicates that the tangent studied T penetrates into or comes out of the danger zone between these two points. This determines two pairs of successive points (P11–P12 and P16–P17 in the example illustrated in FIG. 4) of the contour of the danger zone Mi between which the tangent studied T penetrates into or comes out of the danger zone. It is then enough to compute the geographical co-ordinates of the points of intersection I1, I2 between the tangent studied and two segments demarcated by these two pairs of points P11–P12 and P16–P17 and compute the distances between the point A and the points 11 and 12 and the distance between the point A and the point B of tangency of the studied tangent T with the danger zone M.

If one of the distances A-I1 or A-I2 is smaller than the distance A-B, it means that the tangent T studied meets the danger zone Mi before its point of tangency B. The tangent T studied must therefore be eliminated from the possible tangents for the desired solution.

The computer thus eliminates all the previously computed tangents T that cross a danger zone between their point of tangency with a homing or capture circle and their point of tangency with a danger zone.

In the example of FIG. 2, the computer eliminates the tangents (not shown) to the homing circles R1, R2 and to the zones M2 and M3 as well as the tangents to the capture circles C1, C2 and to the zone M1.

To each non-eliminated tangent of the segment or half-line type respectively, depending on whether the tangent crosses or does not cross a selected danger zone after its point of tangency to a homing circle or before its point of tangency to a capture circle, it assigns the segment type tangents (TC1', TC2') extending between their point of tangency to a homing circle or capture circle and their input point in the danger zone while the half-line type tangents (TR1, TR2, TC1, TC2) originate at their point of tangency to a homing circle or capture circle and extends toward their point of tangency to a danger zone.

Using this distinction between types of tangent, the computer 1 then determines all the points of intersection between the segments or half lines computed here above and not eliminated, TR1, TR2, tangential to a homing circle R1, R2 and those TC1, TC2, TC1', TC2' tangential to a capture circle C1, C2. Thus, it sets up a set of pairs of tangents associated with a point of intersection, each giving a skeleton of a possible avoidance path that does not cross to a danger zone.

The computer then computes the respective lengths of these path skeletons defined by the previously constituted pairs of tangents, to select that one which has the shortest length. Thus, in FIG. 2, the pair of tangents TR1, TC1 define the skeleton of the shortest path.

Then, it seeks to optimize the path demarcated by the selected pair of selected by adding to it a third segment. From this point of view, two cases may arise. In the first case, the two tangents of the selected pair are based on one and the same danger zone. The computer then determines the segment tangential to the danger zone in question which is oriented along the angle of the theoretical route connecting the points I and F and defined by the tangential line $TR_I$ to the homing and capture circles, this segment being demarcated by the points of intersection with the two tangents of the selected pair of tangents.

For this purpose, it is enough to select those points that demarcate the contour of the danger zone, the point located at the greatest distance from the theoretical route $TR_I$, in computing the respective distances from these points to the route, and in considering only the points that are on the same side of the route $TR_I$ as the intersection point of the previously selected tangents TR1, TC1. The tangential segment sought is tangential to the circle of equiprobability centered on the selected point.

In the second case (where the two tangents of the selected pair lie on two different danger zones M1, M2), the computer determines the segment TM that is tangential to these danger zones and is demarcated by the points of intersection with the two tangents TR1, TC1 of the selected pair of tangents.

To this end, it computes the respective distances between the theoretical route $TR_I$ and all the points demarcating the contours of the two danger zones M1, M2 located on the same side of this route with respect to the point of intersection of the previously selected tangents TR1, TC1, and it selects the point located at the greatest distance from the route $TR_I$. The tangential segment sought is the tangent to the circle of equiprobability centered on the selected point and oriented along the route $TR_I$.

Alternately, it selects the two respective points of the two danger zones M1, M2 located at the greatest distance from the route $TR_I$, the tangential segment TM sought being tangential to the circles of equiprobability 11 centered on these two points.

The computer then searches to find out if the segment TM meets a danger zone and computes the length of the segment TM by means of the points of intersection of this segment with the previously selected tangents TR1, TC1. If this segment goes through a danger zone or if its length is smaller than a predefined threshold, which would imply excessively close turning phases, the computer abandons the optimizing of the path to arrive at a two-segment avoidance path.

If not, a three-segment avoidance path TR1, TM, TC1 is obtained.

Once the skeleton of the new path is thus defined by a sequence of two or three segments of tangents, the computer determines the turning phases at each change in course by placing a circle V1, V2 whose radius corresponds to the planned turning radius, so that it is tangential to the path segments down-line and up-line with respect to the turn.

The computer then assesses the relative divergence in curvilinear length between the new path and the direct theoretical path $TR_I$ when there is no threat, the curvilinear length of a path being obtained simply by adding up the lengths of the segment and of the arcs of the path.

If this difference is greater than a predetermined threshold, for example 20%, it attempts to set up a solution known as a solution of penetration inside the field of the danger zone.

In this respect, the pilot may be provided with the possibility of stating that he prefers a solution of evasion to a solution of penetration. To this end, all that he needs to do is to position an indicator by which the computer can be methodically prevented from examining a solution of penetration.

Furthermore, it must be noted that if the non-eliminated tangents lie on one and the same danger zone, it is not possible to penetrate the field of the danger zone and only a solution of evasion is possible. This is also the case where all the non-eliminated tangents are of the half line type.

Figure 5:
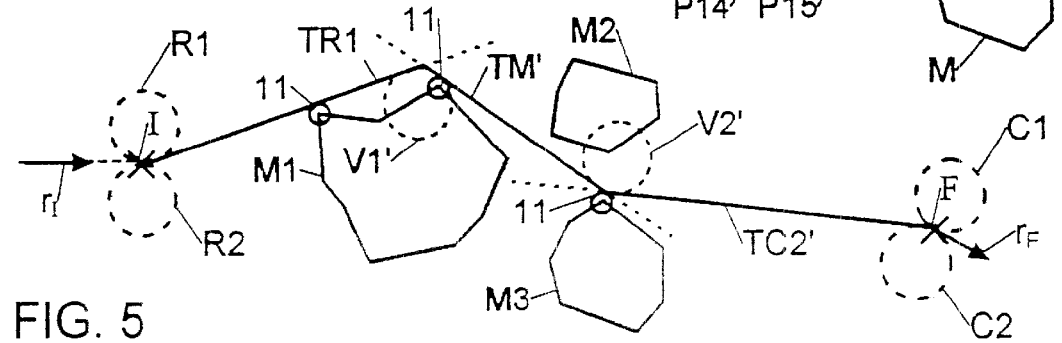
FIG. 5 shows a skeleton of a danger zone avoidance path by penetration into the field of these zones, obtained by the method according to the invention.

To determine a penetration path inside the field of danger zones, the computer 1, as here above, uses the half line or segment type tangents TR1, TR2, TC1, TC2, TC1', TC2' to the homing circles R1, R2 or capture circles C1, C2 and to the danger zones M1, M2, M3 as shown in FIG. 5. Among all these tangents, it selects a pair TR1, TC2' comprising, if any of them exist, one or two segment type tangents TC2' penetrating as deeply as possible into the field of the danger zones before acknowledging one of them and, if not, one or two tangents TR1 of a half line type corresponding to a minimum angle of diversion from the initial route $r_I$ if it is a tangent to a homing circle R1, R2 or final route $r_F$ if is a tangent to a capture circle C1, C2.

The tangential segment that penetrates the deepest into the field of the danger zones is selected by comparing the lengths of these segments projected on the route $TR_I$.

The computer then determines the central segment TM' between these two selected tangents TR1, TC2' lying on the tangent common to the two danger zones M1, M3 on which the selected tangents TR1, TC2' lie (FIG. 5).

Figure 6:
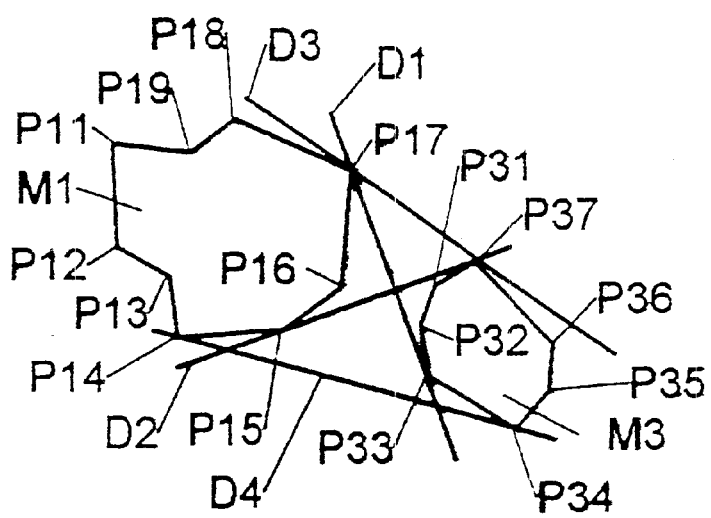
FIG. 6 is a partial view of the field of danger zones used to compute tangents to two danger zones.

For this purpose, the computer determines all the straight lines connecting two successive points P11 to P19 and P31 to P37 for demarcating the contour of the two danger zones M1, M3 and selects the two straight lines D1, D2 that respectively correspond to a maximum and minimum route angle with respect to the North (FIG. 6). Among these two straight lines, it selects the straight line D1 that meets the previously selected tangents TR1, TC2' after the point of tangency of TR1 with the zone M1 and before the point of tangency of TC2' with the zone M2.

Alternatively, the computer makes a selection, among all the straight lines connecting two respective points P11 to P19 and P31 to P37, of the four straight lines D1 to D4 that do not penetrate the zones M1, M3 considered (FIG. 6). Then, among these four straight lines, it selects that straight line D3 that corresponds to a minimum diversion from the tangents TR1, TC2' selected here above and that meets them between their respective points of tangency with the homing circles R1, R2 and capture circles C1, C2.

The selection of a straight line D1 or D3 connecting the two danger zones M1, M3 reveals two respective points P17, P33 or P17, P37 of these two zones for placing the circles of equiprobability 11 on which there lies the segment TM' tangential to the two zones M1, M3. All that needs to be done then, to define the segment, is to seek the point of intersection of this tangent with the tangents TR1, TC2'.

The computer finds out if the segment TM' goes through a danger zone. If this is the case, the solution of penetration into the field of the danger zones is abandoned for the previously computed solution of evasion which is optimized if necessary.

If not the computer, as previously, determines the turning phases at each change in course by placing a turning circle V1, V2, V1', V2' tangential to the path segments that are up-line and down-line with respect to the turn.

It may be planned to compare the respective curvilinear lengths of the evasion paths and penetration paths prepared earlier and select the shortest path.

Figure 7:
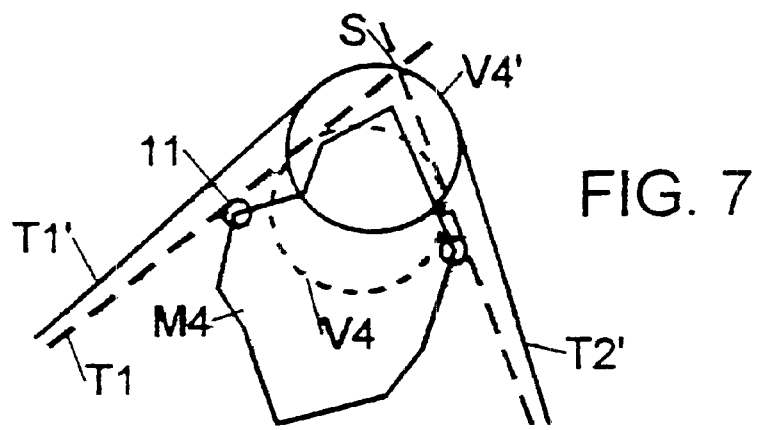
FIG. 7 illustrates a particular case of a shape of danger zone taken into account by the method according to the invention.

As shown in FIG. 7, it may happen, during the placing of the turns V4 at the changes in route, that the turn will intercept the contours of a danger zone M4 implying a period of overflying the danger zone that is greater than the permitted threshold. In this case, the computer 1 searches for another intersection of tangents or places the turning circle V4' in a position where it is not tangential to the two selected tangents T1, T2 but on the intersection S of the tangents T1, T2. The computer 1 then determines two new path segments lying on the two tangents T1' and T2' not to the danger zone M4 but to the turning circle V4'.

Should the computer be incapable of giving an avoidance path, it warns the pilot about it by activating an alarm. If not, it proposes the computed path to the pilot which it may display, for this purpose, on the screen 2 as an overlay on the contours of the danger zone. If the pilot validates this path by a command designed for this purpose, it is sent to the automatic piloting device 5 and followed automatically without any other action by the pilot.

Figure 8:
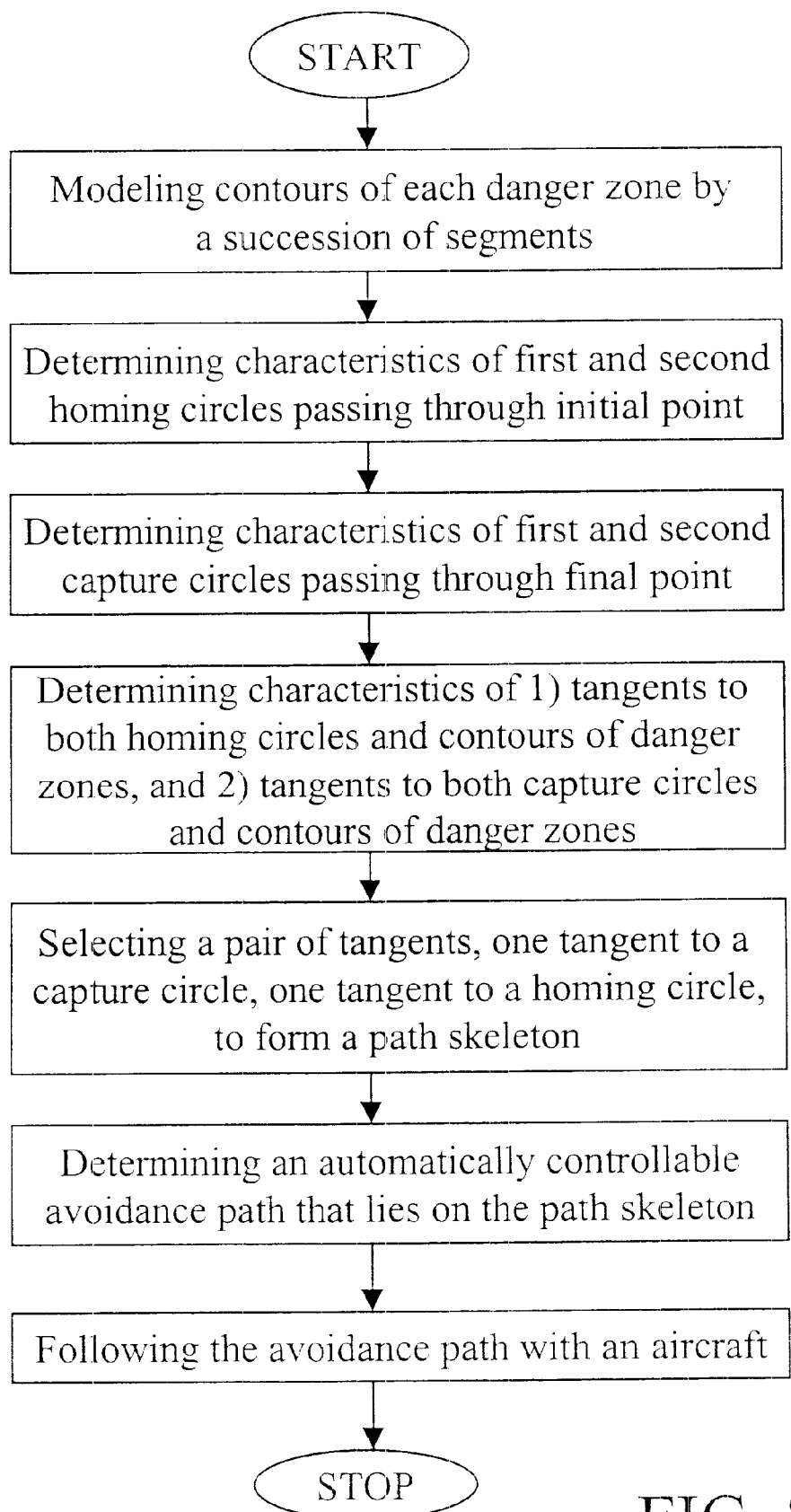
FIG. 8 illustrates the steps comprising the method of the present invention.

This method of path generation (summarized in FIG. 8), which is far less demanding in terms of computation power than the prior art methods, can be used to generate and, above all, to update a long-term path in real time even on board the aircraft that has to follow this path, while taking account of the constraints of the mission and performance levels of the aircraft. Through this method it is possible, at all times on board an aircraft, to have an updated long-term path available in a form that can be directly exploited by the on- board navigation assistance instruments and by an automatic piloting device. This updated long-term path, which is presented on a display at the same time as the current position of the aircraft, enables the pilot who is in the aircraft or is guiding it from the ground to constantly view the trace to be followed. When this path is applied to an automatic piloting device, it enables the tracking, without the pilot's intervention, of the prepared path in taking account of the modifications dictated by the random factors of the mission.

What is claimed is:

1. A method for generating a horizontal path of danger zone avoidance between two obligatory points of passage, one called an initial point and the other called a final point, that complies with constraints of approach, route or course, turning radius at the obligatory points of passage, and avoidance of a field of danger zones, each demarcated by contours, the method comprising the steps of:

modeling contours of each danger zone by a succession of segments demarcated by a plurality of geographical points;

determining characteristics of a first homing circle and a second homing circle, passing through the initial point, that are tangential to an initial route and have a radius corresponding to that of an initial turn, the first and second homing circles having directional senses of travel that are in reverse to each other, determined by the directional sense of the initial route;

determining characteristics of a first capture circle and a second capture circle passing through the final point, that are tangential to a final route and have a radius corresponding to a final turn, the first and second capture circles having directional senses of travel that are in reverse to each other, determined by the directional sense of the final route;

determining characteristics of tangents both to the homing circles and substantially to the contour of each danger zone and tangents both to the capture circles and to the contour of each danger zone;

selecting, among the previously determined tangents, a pair of tangents that intersect, comprising a tangent to one of the homing circles and a tangent to one of the capture circles, the pair of tangents defining a path skeleton connecting a homing circle to a capture circle without penetrating a danger zone;

determining an automatically controllable avoidance path that lies on the previously defined path skeleton; and following the avoidance path with an aircraft.

2. The method according to claim 1, further comprising optimizing the avoidance path by adding an intermediate path segment between the routes of the previously selected pair of tangents.

3. The method according to claim 1, wherein circles of equiprobability of danger are centered on the plurality of geographical points demarcating the contour segments of the danger zones, the diameter of these circles corresponding to a fineness of meshing of terrain, the tangents to the danger zones being tangential to these circles.

4. The method according to claim 1, further comprising preselecting danger zones to be taken into account for the computation of an avoidance path, by selecting all danger zones that have points of definition of their contour located in a disk centered on the middle of the segment demarcated by the initial point and the final point, and including these points.

5. The method according to claim 1, wherein prior to selecting the pair of tangents defining the path skeleton, the method further comprises:

determining possible points of intersection between the previously determined tangents and the danger zones; and eliminating tangents that go through a danger zone between their points of tangency to a danger zone and to a homing or capture circle, each of the non-eliminated circles being limited to a half line whose point of origin is its point of tangency to a homing or capture circle and extending from its point of tangency to a danger zone, this half line being reduced to a straight line segment extending from this point of origin, and being located outside any danger zone.

6. The method according to claim 5, wherein selecting a pair of tangents comprises:

locating points of intersection between the tangents reduced to half lines or segments, coming from homing circles and capture circles, respectively, each point of intersection found corresponding to a pair of tangents that defines a possible path skeleton; and selecting, among all the pairs of tangents corresponding to the located points of intersections, that pair of tangents which leads to the shortest path.

7. The method according to claim 1, wherein if the determined avoidance path has a length exceeding a certain threshold that is predetermined in relation to the length of the initial path without danger zones, then the method further comprises determining an avoidance path that penetrates the interior of the field of danger zones without going through a danger zone.

8. The method according to claim 7, wherein determining an avoidance path that penetrates the interior of the field of the danger zones comprises:

selecting a pair of tangents, tangential to a homing circle and to a capture circle, respectively, comprising up to two tangents of the segment type penetrating as far as possible into the field of danger zones, if they exist, or, if necessary, of the half-line type which corresponds to a minimum angle of diversion from the initial route if it is a tangent to a homing circle or final route if it is a tangent to a capture circle;

determining a segment that is tangential to the danger zones on which the tangents of the selected pair lie, and demarcated by the points of intersection with these tangents; and determining an avoidance path lying on the path skeleton demarcated by the selected pair of tangents and the previously determined tangent segment.

9. The method according to claim 8, wherein determining a segment tangential to two danger zones comprises:

selecting from among all straight lines connecting two respective points of two danger zones, two straight lines respectively having a minimum and a maximum route angle; and selecting, from these two straight lines, a straight line that meets the previously selected tangents between their respective points of tangency to the two danger zones.

10. The method according to claim 8, wherein determining a segment tangential to two danger zones comprises:

selecting four straight lines connecting two respective points of the two danger zones, but not penetrating the danger zones; and selecting one of these four straight lines that meets the previously selected tangents between their respective points of tangency to the homing circles and capture circles.

11. The method according to claim 1, wherein determining an avoidance path from a previously obtained path skeleton, comprising two or three segments, includes determining turning phases, by placing, in the vicinity of each junction point of two segments of the path skeleton, a turning circle with a predetermined turning radius tangential to these two segments.

12. The method according to claim 11, wherein, if an arc of a turning circle goes through a danger zone, the method comprises:

placing a new turning circle centered on the junction point between the two path skeleton segments; and computing new avoidance path segments tangential to the new turning circle.

* * * * *